US011763275B2

(12) United States Patent
Kim et al.

(10) Patent No.: US 11,763,275 B2
(45) Date of Patent: Sep. 19, 2023

(54) SYSTEM AND METHOD FOR CRYPTOCURRENCY POINT OF SALE

(71) Applicant: Coinbase, Inc., San Francisco, CA (US)

(72) Inventors: Kaiser Kim, San Francisco, CA (US); Paul Collier, San Francisco, CA (US); Sahil Amoli, San Francisco, CA (US); Justin O'Brien, San Francisco, CA (US); Bojan Joveski, San Francisco, CA (US); Tyson Battistella, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 0 days.

(21) Appl. No.: 17/000,961

(22) Filed: Aug. 24, 2020

(65) Prior Publication Data

US 2020/0394620 A1    Dec. 17, 2020

Related U.S. Application Data

(63) Continuation-in-part of application No. 16/810,677, filed on Mar. 5, 2020, now Pat. No. 11,151,525.
(Continued)

(51) Int. Cl.
*G06Q 20/20* (2012.01)
*G06Q 20/06* (2012.01)
*G06Q 20/38* (2012.01)

(52) U.S. Cl.
CPC ......... *G06Q 20/0658* (2013.01); *G06Q 20/20* (2013.01); *G06Q 20/389* (2013.01); *G06Q 20/3829* (2013.01); *G06Q 2220/00* (2013.01)

(58) Field of Classification Search
None
See application file for complete search history.

(56) References Cited

U.S. PATENT DOCUMENTS

| 10,269,009 B1* | 4/2019 | Winklevoss | ....... G06Q 20/3674 |
| 2015/0324789 A1* | 11/2015 | Dvorak | .................. H04W 12/06 |
| | | | 705/67 |

(Continued)

OTHER PUBLICATIONS

"An analysis of batching in Bitcoin", Coin Metrics team, May 20, 2018, https://coinmetrics.io/batching/.
(Continued)

*Primary Examiner* — William J Jacob
(74) *Attorney, Agent, or Firm* — Perkins Coie LLP

(57) ABSTRACT

Systems and methods for enabling auxiliary accounts and/or auxiliary devices to create and process cryptocurrency transactions on a behalf of a primary account while enforcing limited auxiliary entity access to the primary entity's overall transaction information. Cryptocurrency transactions may be point of sale charges. Some methods may include receiving a charge request from a payor system, determining a merchant cryptocurrency address for the charge request, providing the merchant cryptocurrency address to the payor system, generating a transaction that identifies the merchant cryptocurrency address, signing the transaction, broadcasting the transaction, storing the merchant cryptocurrency address in association with information, related to the charge request, detecting a blockchain transaction that identifies the merchant cryptocurrency address, and/or detecting at least one transaction confirmation for the detected blockchain transaction.

20 Claims, 11 Drawing Sheets

Related U.S. Application Data

(60) Provisional application No. 63/017,478, filed on Apr. 29, 2020, provisional application No. 62/985,471, filed on Mar. 5, 2020, provisional application No. 62/891,146, filed on Aug. 23, 2019, provisional application No. 62/836,259, filed on Apr. 19, 2019, provisional application No. 62/814,194, filed on Mar. 5, 2019.

(56) References Cited

U.S. PATENT DOCUMENTS

| | | | |
|---|---|---|---|
| 2015/0332256 A1 | 11/2015 | Minor | |
| 2015/0332395 A1 | 11/2015 | Walker et al. | |
| 2015/0363769 A1 | 12/2015 | Ronca et al. | |
| 2016/0283941 A1* | 9/2016 | Andrade | G06Q 20/36 |
| 2017/0187535 A1* | 6/2017 | Middleton | H04L 9/3247 |
| 2018/0276626 A1* | 9/2018 | Laiben | G06Q 20/02 |
| 2018/0349896 A1* | 12/2018 | Arora | G06Q 20/383 |
| 2019/0220859 A1* | 7/2019 | Weight | G06Q 20/381 |
| 2019/0268165 A1* | 8/2019 | Monica | G06F 21/78 |
| 2019/0287174 A1* | 9/2019 | Black | H04L 9/3239 |
| 2019/0333051 A1* | 10/2019 | Brogger | G06Q 40/04 |
| 2020/0266997 A1* | 8/2020 | Monica | H04L 9/0637 |

OTHER PUBLICATIONS

"BitAuth, for Decentralized Authentication", bitty, Engineering, Jul. 1, 2014, https://bitpay.com/blog/bitauth-for-decentralized-authentication/.

"BitPay Introduces Stable Coin Settlements in Gemini Dollars and Circle USD Coin", https://bitpay.com/blog/stable-coin-settlement/, Oct. 15, 2018.

"Coinbase Commerce API", https://web.archive.org/web/20180507175332/http://commerce.coinbase.com/docs/.

"ERC20 Token Payment Processing—Powered by CoinPayments", https://blog.coinpayments.net/announcements/erc20-token-payment-processing-powered-by-coinpayments, May 28, 2018.

"Integrate crypto payments into your .Net applications with AtomicPay", https://msicc.net/integrate-crypto-payments-into-your-net-applications-with-atomicpay/, Jan. 10, 2019.

"Merchant Payment Gateway", Coingate, https://developer.coingate.com.

Andrews, Jordan, "The CREATE2 OpCode and DApp Onboarding in Ethereum", https://hackemoon.com/the-create2-opcode-and-dapp-onboarding-in-ethereum-e2178e6c20cb, Jan. 12, 2019.

Faridi, Omar, "Global Cryptocurrency Payments Solution to Support 156 Crypto-to-Fiat Options", https://www.cryptoglobe.com/latest/2019/01/non-custodial-crypto-payment-solution-launched-by-atomicpay/, Jan. 13, 2019.

Gogo, Jeffrey, "Thai Startup Atomicpay Launches Non-Custodial Cryptocurrency Payments Platform", https://news.bitcoin.com/thai-startup-atomicpay-launches-non-custodial-crpto-payment-platform/ Jan. 12, 2019.

Petersen, Cole, "Coinbase Commerce Announces Addition of New Features, Faces Increasing Competition", Cryptocurrency Technology, Aug. 3, 2018, (https//www.newsbtc.com/category/crypto-tech/).

Strelov, Aleksandr, "Accepting payments in Ethereum and ERC20 tokens", steemit, https://steemit.com/cryptocurrency/@ivelon/accepting-payments-in-ethereum-and-erc20-tokens.

* cited by examiner

SYSTEM AND METHOD FOR CRYPTOCURRENCY POINT OF SALE

CROSS-REFERENCE TO RELATED APPLICATIONS

This application is continuation-in-part of U.S. application Ser. No. 16/810,677, filed 5 Mar. 2020, which claims the benefit of U.S. Provisional Application No. 62/814,194, filed 5 Mar. 2019, and U.S. Provisional Application No. 62/836,259, filed 19 Apr. 2019 which are each incorporated herein in its entirety by this reference.

This application claims the benefit of U.S. Provisional Application No. 62/891,146, filed 23 Aug. 2019, U.S. Provisional Application No. 62/985,471, filed 5 Mar. 2020, and U.S. Provisional Application No. 63/017,478, filed 29 Apr. 2020, which are each incorporated herein in its entirety by this reference.

TECHNICAL FIELD

This invention relates generally to the cryptocurrency field, and more specifically to a new and useful point of sale system and method in the cryptocurrency field.

BACKGROUND

There is a need in the cryptocurrency field to create a new and useful point of sale system and method.

DESCRIPTION OF THE PREFERRED EMBODIMENTS

Figure 1A:
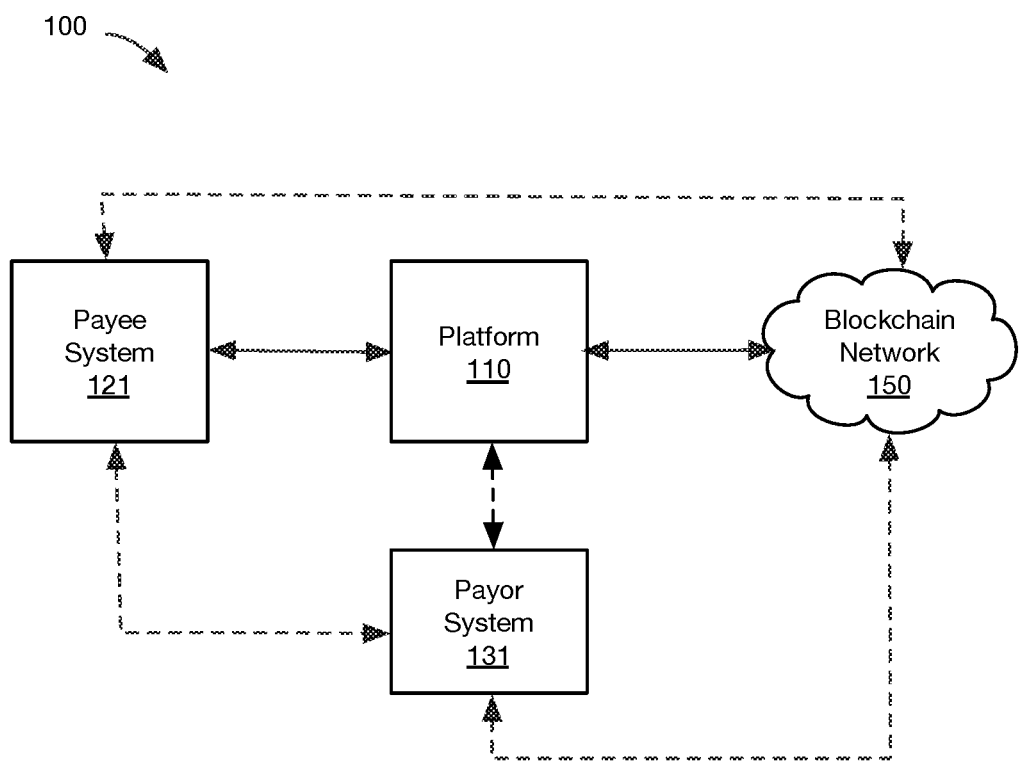
FIGS. 1A-B are schematic representations of variants of the system.

The following description of the preferred embodiments is not intended to limit the invention to these preferred embodiments, but rather to enable any person skilled in the art to make and use this invention.

1. Overview.

The method includes one or more of: payor system configuration; charge processing; management of charge information; management of payor systems, and withdrawal processing. The method functions to enable auxiliary accounts (e.g., auxiliary devices) to create and process cryptocurrency transactions on behalf of a primary account (e.g., primary device), while enforcing limited auxiliary entity access to the primary entity's overall transaction information.

At least a portion of the method can be performed by a system (disclosed herein). The system can include one or more of a platform (e.g., a cryptocurrency platform, a merchant services platform, a payment platform, a point of sale platform, etc.), a payee system (e.g., a merchant system), and a payor system (e.g., a point of sale (POS) system), a customer device, and/or other systems. In some examples, one or more payor systems (e.g., auxiliary account) can be paired with one or more merchant accounts (e.g., primary account, managed by the platform). Merchant accounts can be any suitable type of merchant account. Example merchant accounts include cryptocurrency-specific payment processing accounts, multi-method payment processing accounts, and the like. Multi-method payment processing accounts can support cryptocurrency payment processing along with other forms of payment processing.

The system and method are preferably used in physical commercial context, with physical point of sale systems, but can alternatively be used in a virtual commercial context, where the "POS system" can be a browser plugin, a website integration (e.g., iFrame, etc.), or otherwise used. In a first example, multiple POS systems located in a single storefront (e.g., a coffee shop) can be paired with a single merchant account. In a second example, POS systems located in different storefronts (e.g., different coffee shops locations of a single coffee shop company) can be paired with a single merchant account. In a third example, POS systems located in different storefronts (e.g., different coffee shops locations of a single coffee shop company) can be paired with respective merchant accounts for a same business entity (e.g., a coffee shop business can have a separate merchant account for each store location, and each POS system at a same location can be paired with a same merchant account). However, POS systems and merchant accounts can be paired in any suitable type of configuration.

2. Benefits.

The system and method can confer several benefits over conventional systems and methods.

First, a payor system can be linked to a merchant account without providing an auxiliary account or device (e.g., a POS system) with full access to the primary account (e.g., merchant account). For example, rather than providing a POS system with a merchant account public key (e.g., a xPubKey, child public keys), the POS system can receive a merchant identifier that can be used to initialize a POS charge to a customer (and optionally receive charge information or status of charges). In an example, the merchant identifier can be used by the platform to identify a cryptocurrency address, associated with the merchant, that is to receive payment for the charge. In a specific example, since the auxiliary account only has access to the cryptocurrency address (and not the public key or private key used to derive the cryptocurrency address), the auxiliary account cannot determine or track other cryptocurrency addresses associated with the primary entity, and therefore cannot determine the primary entity's balance.

Second, by sending only a merchant identifier (and not any public or private keys) to the POS system, use of a corresponding merchant account can be revoked (e.g., by invalidating the merchant identifier, changing access permissions for the merchant identifier, etc.).

Third, by sending only a merchant identifier (and not any public or private keys) to the POS system, access permissions for use of a corresponding merchant account can be managed. For example, functionality such as initiating charges, viewing of all POS charges, or other functionalities can be configured for one or more merchant identifiers.

Fourth, by sending each POS system a unique merchant identifier, charges generated at each POS system (or charges generated by each store location) can be tracked and/or recorded by merchant identifiers. For example, each store location can be assigned a different merchant identifier, and charges can be tracked to each location by using the assigned merchant identifiers.

Fifth, the platform can easily provide a holistic view of a merchants' transactions by monitoring blockchains for specific addresses (e.g., the addresses that the platform has generated or supplied), instead of monitoring the blockchains for all possible addresses from the public key. This can reduce computational cost and increase the charge confirmation speed.

Sixth, some variants enable the payor system (e.g., POS system) to natively generate the transaction instead of redirecting the payor system to a domain hosted by the platform. This can decrease user friction, give developers more control over the payment application design, and give developers more control over what information is retrieved (e.g., addresses for all supported cryptocurrencies, addresses for a specific cryptocurrency, a platform-generated transaction, etc.).

However, further advantages can be provided by the system and method disclosed herein.

3. System.

The system functions to perform at least a portion of the method. The system can be a cloud-based system, an on-premises system, a mobile system, or any combination thereof. The system can be a single-tenant system, a multi-tenant system, or any combination of single-tenant and multi-tenant components.

Figure 1B:
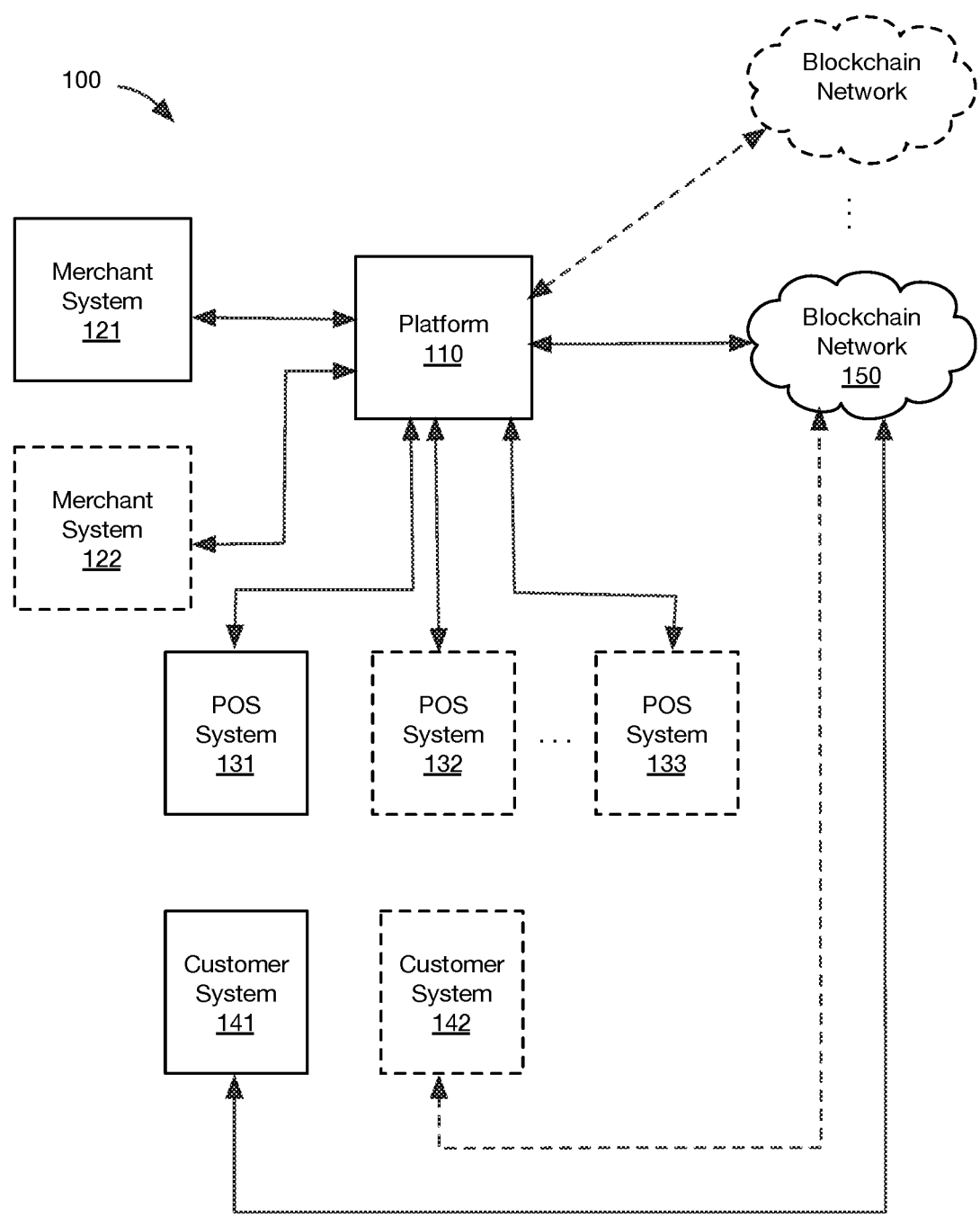
Figure 2:
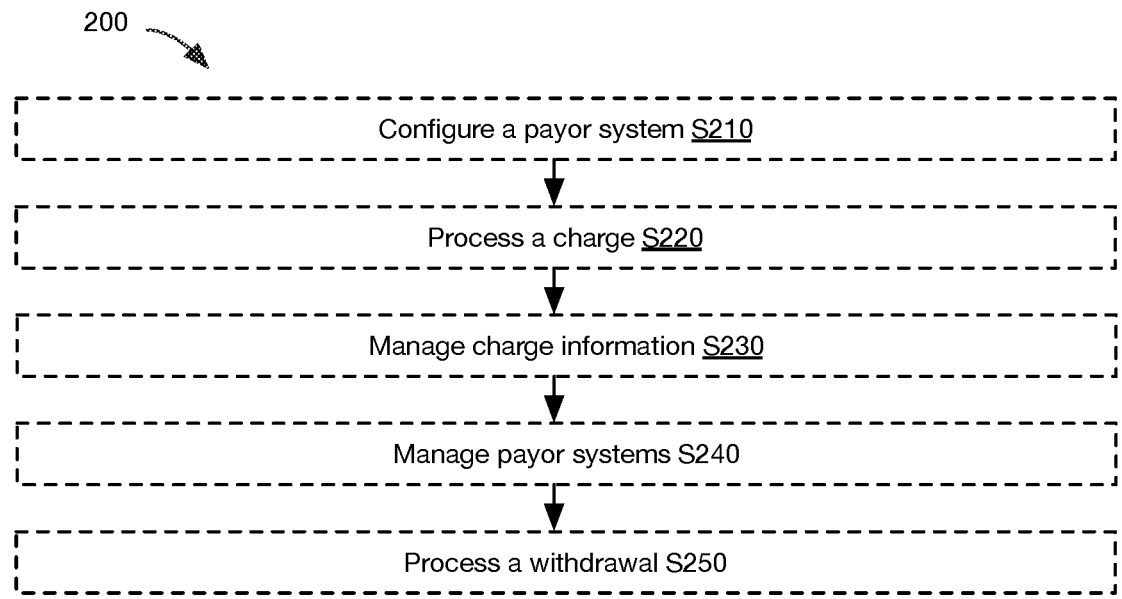
FIG. 2 is a flowchart diagram of variants of the method.

FIGS. 1A-B are schematic representations of variants of the system.

In some variations, the system 100 includes one or more of: a platform 110, a payee system (e.g., 121, 122) (e.g., a merchant system), a payor system (e.g., 131-133) (e.g., a point of sale system), a customer system (e.g., 141, 142), and a blockchain network 150. In some variations, two or more components of the system 100 can be communicatively coupled via one or more networks (e.g., a public network, a private network, an ad hoc network, etc.).

In some variations, the platform 110 can be a cryptocurrency platform, a merchant services platform, a payment platform, a point of sale platform, or any suitable type of platform that can function to manage merchant accounts. In some variations, the merchant accounts are cryptocurrency-specific payment processing accounts. In some variations, the merchant accounts are multi-method payment processing accounts. However, merchant accounts can be any suitable type of account that supports cryptocurrency payment processing. In some variations, the merchant accounts are associated with one or more of a cryptocurrency account and a cryptocurrency address. The platform 110 can include an API (Application Programming Interface) for interacting with one or more of a merchant system and a POS system. In some variations, the API can function to interact with at least one customer system. The platform 110 can include an interface for sending data (e.g., transactions) to, and reading data from, a blockchain network (e.g., 150).

In some variations, the platform 110 is a multi-currency platform that functions to process charge requests for one or more of fiat currency and a cryptocurrency. In some variations, the platform 110 supports processing of charge requests for multiple cryptocurrencies, and includes an interface for interfacing with each of a plurality of blockchain networks for respective ones of the supported cryptocurrencies. In some variations, the platform 110 enables merchant account holders to receive payment in multiple types of cryptocurrencies, thereby allowing customers flexibility in choosing to pay by using cryptocurrency that they currently hold, without requiring customers to first convert their cryptocurrency to a supported cryptocurrency. Examples of cryptocurrencies supported by the platform 110 can include: UTXO-based cryptocurrencies (e.g., that generate a new address for each transaction, such as bitcoin), account-based cryptocurrencies (e.g., capable of reusing an address for multiple transactions, such as Ethereum or ERC20 tokens), and/or other cryptocurrencies.

In some variations, the platform 110 includes at least one processor that functions to execute machine-executable program instructions that are stored on a computer-readable medium (e.g., hard drive, optical drive, flash drive, non-volatile memory, volatile memory, etc.), and the instructions are instructions for performing at least a portion of the method described herein.

The platform 110 can include a data structure that associates at least one merchant account with one or more of: account authentication information; a merchant identifier; merchant identifier access permissions; a cryptocurrency public key (e.g., a xPubKey); a cryptocurrency private key; a cryptocurrency address; a cryptocurrency account; information identifying associated POS systems (e.g., a POS system identifier); information identifying POS charges made using the merchant account; information related to POS charges (e.g., charge metadata, charge information); a pairing code; information identifying merchant account withdrawals; merchant dashboard information; merchant checkout information; merchant product information; merchant services information; and merchant blockchain transaction information.

In a specific example, the platform 110 stores multiple merchant accounts, wherein each merchant account is associated with: a cryptocurrency public key; a set of cryptocurrency addresses; a set of charges and associated charge state (e.g., "pending," "completed," "incomplete," "void," etc.); a set of payor system identifiers, associated merchant identifiers (e.g., access tokens), associated merchant identifier state (e.g., "valid," "invalid," etc.), and/or associated permissions (e.g., history access, etc.); a set of pairing codes; and/or other information (e.g., login information).

In this example, the cryptocurrency private key is preferably not custodied by the platform and is custodied (e.g., controlled by, stored by) the user (e.g., merchant). Alternatively, the platform can custody the cryptocurrency private key (e.g., in cold storage, example described in Ser. No. 16/386,786 filed 17 Apr. 2019 which is incorporated herein in its entirety by this reference; using a reusable key, example described in Ser. No. 16/983,216 filed 3 Aug. 2020 which is incorporated herein in its entirety by this reference; etc.).

In this example, the set of cryptocurrency addresses can be addresses for all assets supported by the platform, be addresses for assets requested by the payor system (e.g., the customers' payment asset), or be addresses for any other suitable set of assets. The set of cryptocurrency addresses can be: pregenerated (e.g., bulk-generated), generated in response to receiving the charge request, or generated at any other suitable time.

In this example, the set of charges can be the charges initiated by the set of POS systems associated with the merchant account. Each charge can be associated with: a different cryptocurrency address (e.g., different Ethereum address generated from the same xPubKey for transaction tracking purposes, different UTXO address, etc.), a transaction identifier (e.g., transaction hash), a state (e.g., "pending" when the transaction is detected on-chain, "completed"

when the transaction is confirmed, "void" when the transaction is not confirmed within a predetermined time period, etc.), and optionally charge information, customer information, bill of sale information (e.g., items purchased), and/or other information.

However, the platform 110 can include any suitable information for a merchant account in a data structure.

In some examples, one or more payor systems can be paired with one or more merchant accounts (e.g., managed by the platform 110). In some variations, the merchant accounts are cryptocurrency-specific payment processing accounts. In some variations, the merchant accounts are multi-method payment processing accounts. However, merchant accounts can be any suitable type of account that supports cryptocurrency payment processing.

Payor systems, payee systems, and customer systems can include any suitable type of system (e.g., software system, hardware system, combination of hardware and software system, etc.). In some variations, such systems can include at least one processor that functions to execute machine-executable program instructions that are stored on a computer-readable medium (e.g., hard drive, optical drive, flash drive, non-volatile memory, volatile memory, etc.). The instructions can be instructions for performing at least a portion of the method described herein. In some implementations, one or more of a payor system, a payee system, and a customer system can be any one of a computer, a mobile device (e.g., phone, tablet, wearable device, etc.), an embedded device (e.g., a system on a chip embedded in a vehicle, mobile device, computer, kiosk, appliance, wearable device, etc.), and a server. In some variations, payor systems include POS terminals that include one or more of a display device, a processing system, and a secondary payment processing device (e.g., a payment card reader, NFC reader, ApplePay reader, etc.). However, payor systems, payee systems, and customer systems can include any suitable type of systems. Alternatively, the payor system can be a third party website, a native application, or be otherwise configured. Each payor system preferably stores the addresses that it received from the platform (e.g., in response to a charge request), but can alternatively store no charge information.

Payor systems associated with a same merchant account can be arranged at a same physical location (e.g., a storefront), different locations (e.g., different store fronts), etc. However, payor systems can be arranged and paired with merchant accounts in any suitable type of configuration.

4. Method.

FIGS. 2, 3A-B, 4, 5, 6A-C and 7 are representations of the method in accordance with variants.

In some variations, the method (e.g., 200) includes one or more of: configuring a payor system (e.g., a POS system) S210; processing a charge (e.g., a POS charge) S220; managing charge information S230; managing at least one payor system (e.g., POS system) S240; and processing a withdrawal S250. At least a portion of the method can be performed by one or more components of the system (e.g., 100) (disclosed herein).

Figure 5:
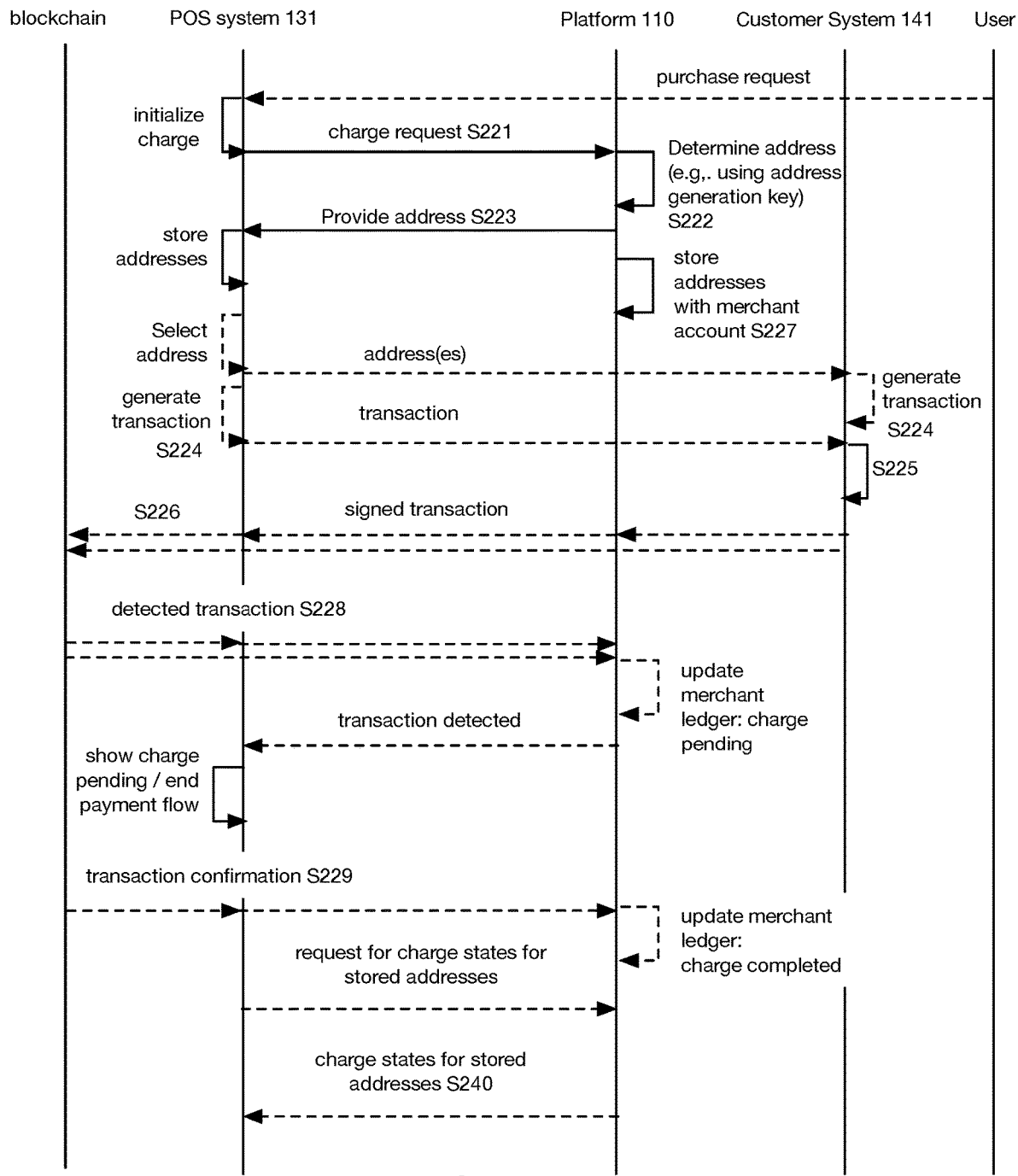
FIG. 5 is a schematic representation of a variant of charge processing.
Figure 6A:
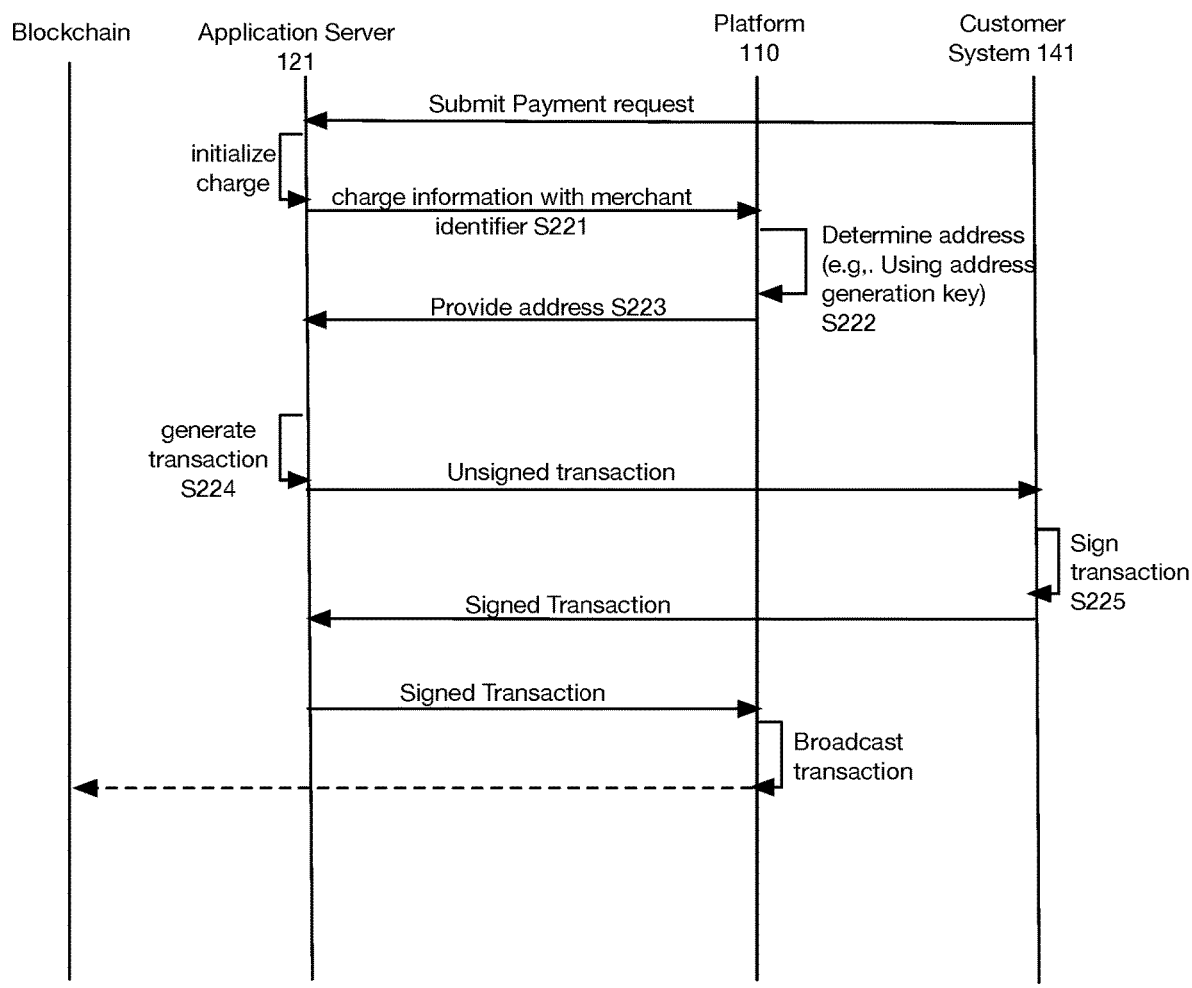
FIGS. 6A-C are schematic representations of variants of charge processing, respectively.
Figure 6B:
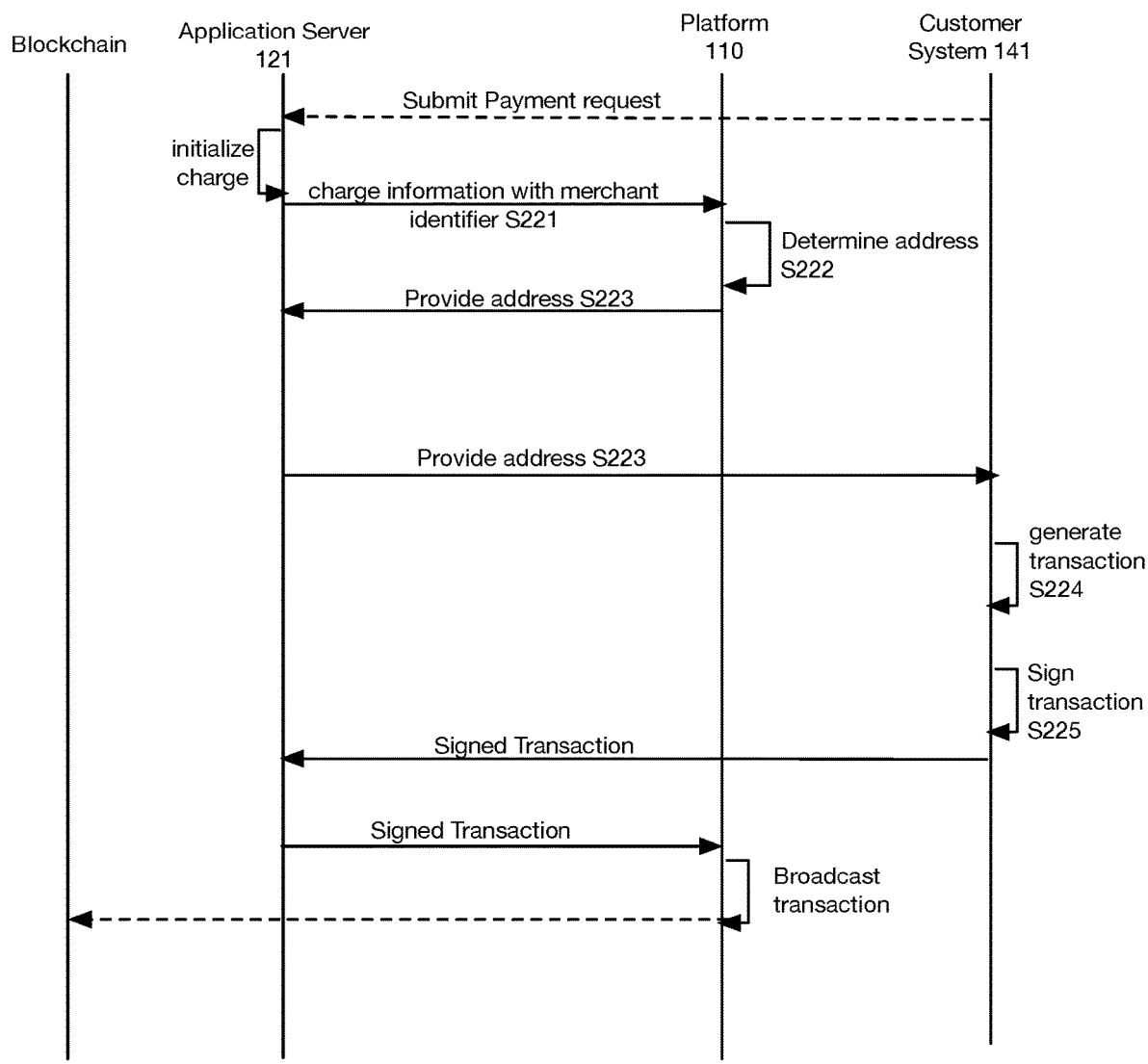
Figure 6C:
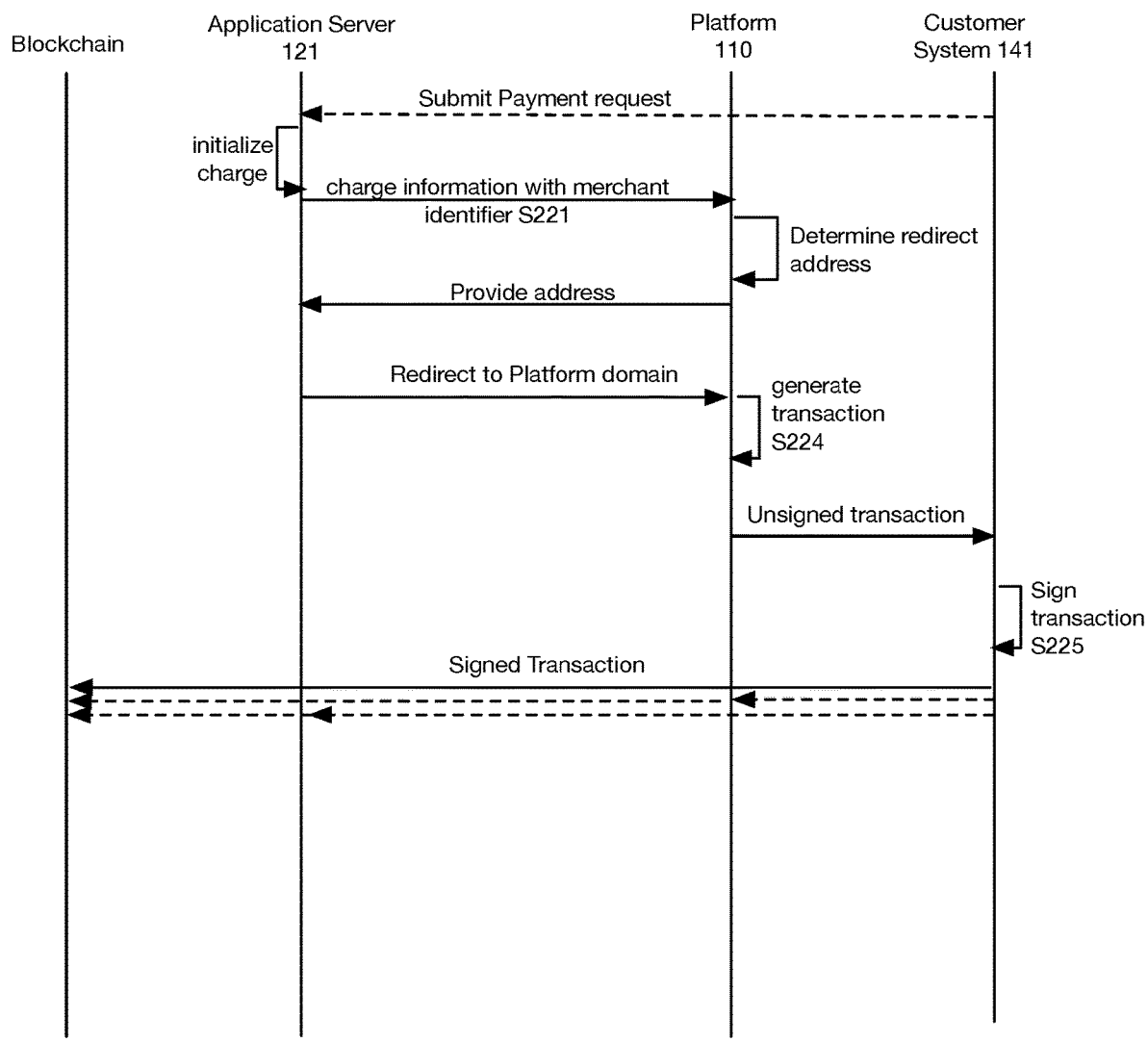
Figure 7:
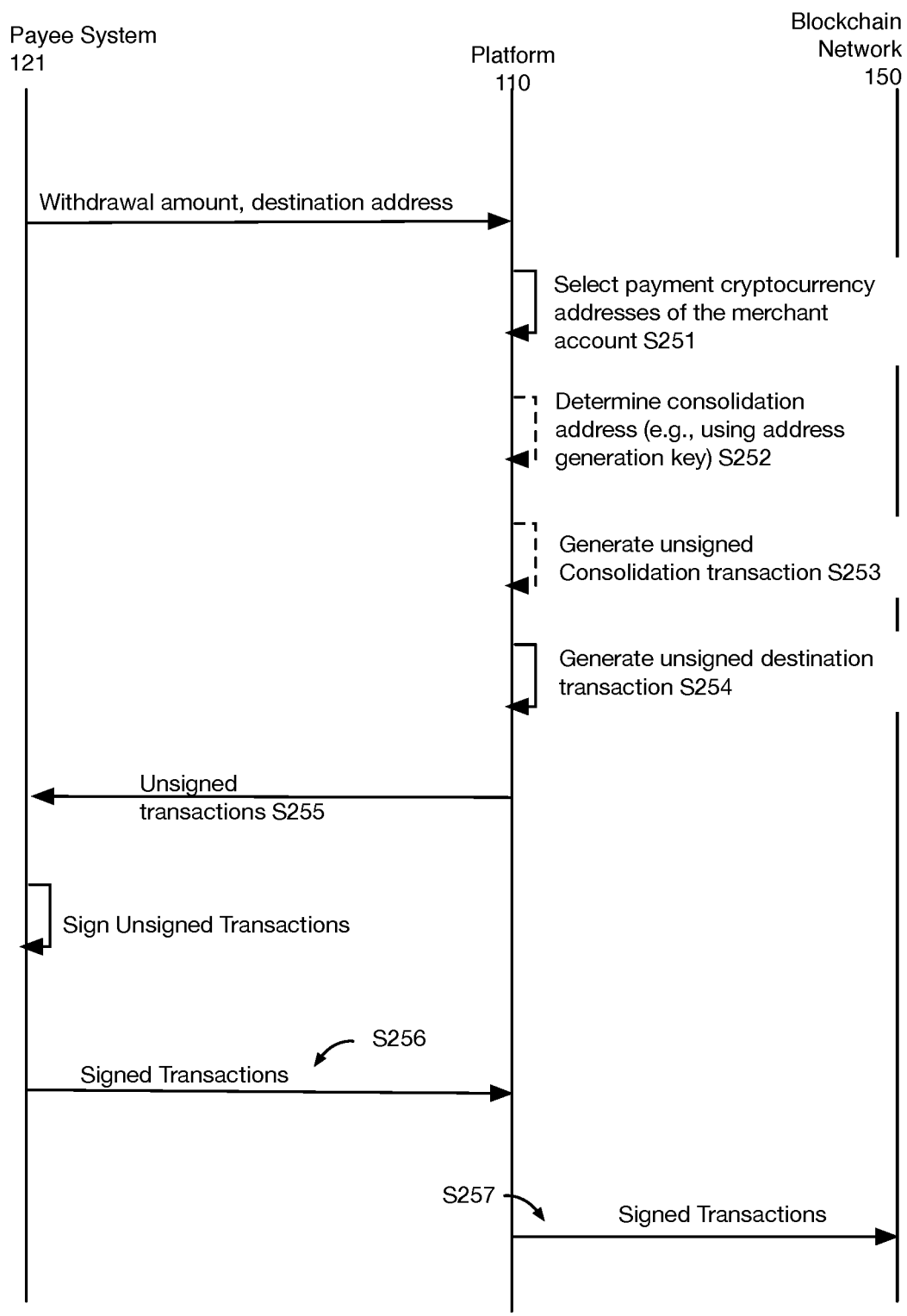
FIG. 7 is a schematic representation of a variant of processing a withdrawal request.

FIG. 5 shows an example method of using a POS system to initiate a charge. FIGS. 6A-C show an example method of using an application server (e.g., a shopping cart application, etc.) to initiate a charge. FIG. 7 shows an example method of processing a withdrawal.

S210 functions to configure a payor system (e.g., 131-133). S210 can include configuring multiple payor systems (e.g., multiple payor systems at a single location, multiple payor systems across multiple locations, etc.). In variants, S210 functions to link the payor system to a merchant account managed by the platform (e.g., 110), such that the payor system can initiate charge requests that use merchant cryptocurrency addresses associated with the merchant account. In variants, at least one payor system is a POS system (e.g., a POS terminal).

Figure 3A:
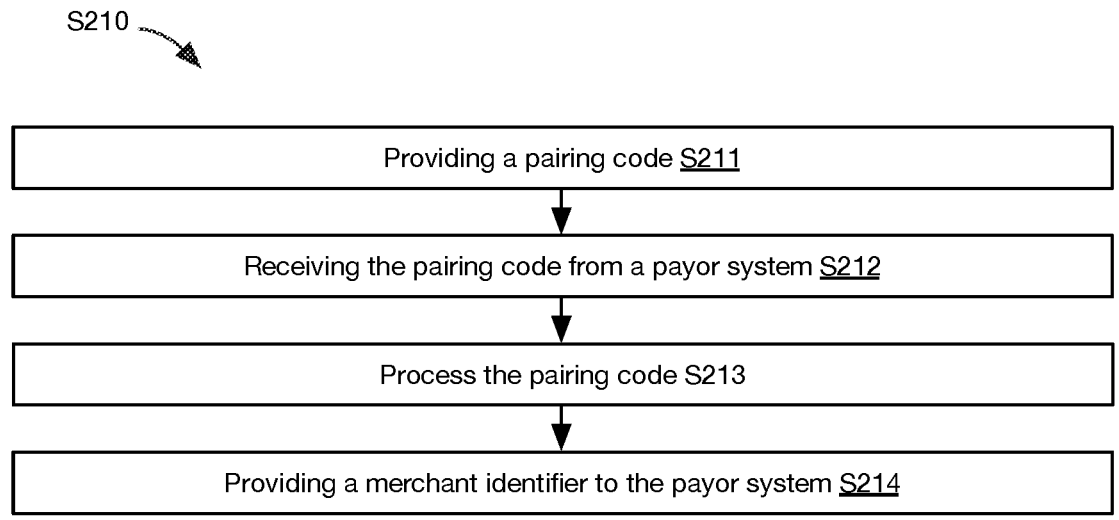
FIGS. 3A and 3B are flowchart diagrams of variants for linking the payee system to the merchant account and processing a charge request, respectively.
Figure 4:
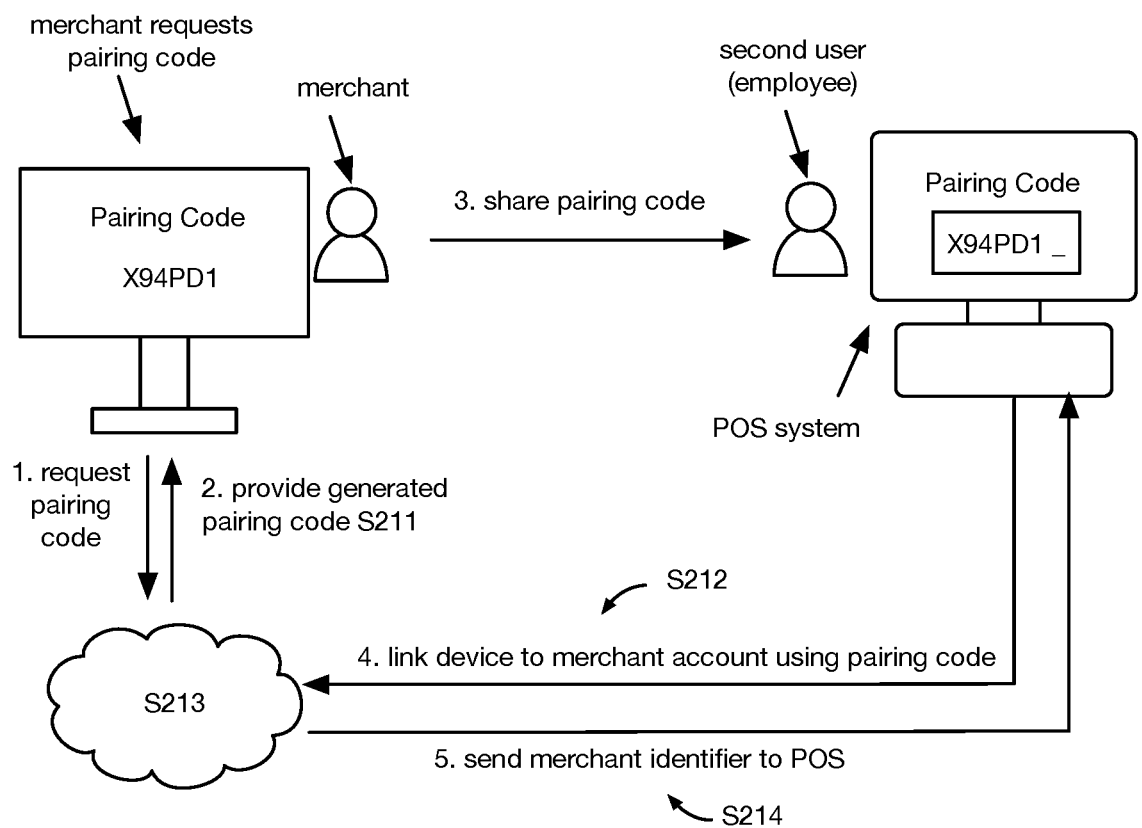
FIG. 4 is a schematic representation of an example of linking the payee system to the merchant account.

S210 can include one or more of: providing a pairing code for a merchant account from the platform (e.g., 110) to a payee system (e.g., merchant system) (e.g., 120) S211; the platform receiving the pairing code from a payor system (e.g., POS system) (e.g., 131) S212; the platform processing the pairing code S213; and the platform providing a merchant identifier for the merchant account to the payor system (e.g., 131) S214 (e.g., as shown in FIGS. 3A and 4). In some variations, one or more of S211-S214 can be repeated to configure several payor systems.

S211 can include the platform 110 providing the pairing code to a payee system (e.g., 121, 122).

The pairing code can be a one-time code, a geo-limited code, a time-limited code, an unlimited code, or any suitable of limited or unlimited code. The pairing code can be text, a visual identifier (e.g., QR code, barcode, etc.), a wireless identifier (e.g., NFC identifier, Bluetooth identifier, etc.), acoustic pattern, or any other suitable format. The pairing code is preferably specific to and stored in association with the merchant account (e.g., associated with the pairing request), but can alternatively be shared between merchant accounts or otherwise related to merchant accounts. In some variations, the platform 110 associates the pairing code with a merchant account identified by the pairing request (e.g., by storing information in the data structure that identifies the pairing code as a pairing code for the merchant account).

The pairing code can be provided as a response to a pairing request for the pairing code. The pairing request can be sent by the merchant account, an auxiliary account (e.g., a POS account), or any other suitable account. The platform can receive the request via an API (e.g., a public API, a private API, an HTTP-based API, a REST API, etc.). In some variations, the pairing request includes merchant account information (e.g., credentials for a merchant account, a security token for the account, a session identifier for an authenticated communication session for the account, information identifying the merchant, a POS system identifier, etc.), and/or other information. In some variations, the pairing request can be provided by a system that does not have access to credentials for the merchant account. In some implementations, the pairing request identifies an endpoint that is to receive the requested pairing code (e.g., another merchant system, a POS system, a mobile device, etc.).

The pairing code is preferably generated or retrieved by the platform, and returned in response to the pairing request (e.g., to the requesting account or device). In some variations, the platform generates the pairing code in response to verification of the pairing request by the platform (e.g., verifying that the pairing request includes valid credentials, verifying the pairing code is provided by an authorized POS system, etc.). In a first variation, the pairing request is provided by a merchant system, the pairing request includes credentials for the merchant account, and the platform generates the pairing code responsive to validation of the credentials. In a second variation, the pairing request is provided by a POS system, the pairing request includes information identifying the POS system, and the platform generates the pairing code responsive to a determination that the identified POS system is authorized to use a pairing code for the merchant system (e.g., the POS system identifier is included in information that identifies POS systems that are authorized to use the merchant account).

The pairing code can be shared with another system (e.g., a POS system). The pairing code is preferably shared with the auxiliary devices after the requesting device receives the pairing code, but can alternatively be shared directly with the auxiliary devices. The pairing code is preferably shared by the merchant account with the auxiliary accounts, but can alternatively be shared between auxiliary accounts or otherwise shared. The pairing code can be shared by remote transmission, manual entry, wireless transmission (e.g., NFC communication, Bluetooth communication, Internet communication, etc.), or otherwise shared. In a first example, the system receiving the pairing code from the platform displays the pairing code on a display device, and a first human user (e.g., an owner or manager of a merchant account associated with the pairing code) perceives the displayed pairing code. The first human user can then share the pairing code with a second human user (e.g., an employee of the first human user). The second human user can then provide the pairing code to a POS system (e.g., 131-133) (e.g., as shown in FIG. 4). The second human user can provide the pairing code to the POS system by using one or more of a camera, a user interface displayed by the POS system, and a network interface device. In a second example, the first human user provides the pairing code to a POS system (e.g., 131-133) (e.g., as shown in FIG. 4). In a third example, the system (e.g., 121, 122) receiving the pairing code can communicate directly with the POS system (e.g., 131-133) and automatically provide the pairing code to the POS system (e.g., the POS system can scan the QR code from the system receiving the pairing code).

The pairing code can be used by a system (e.g., a POS system, etc.) to access a merchant identifier used to initiate charge transactions that send payment to the merchant account. The pairing code can optionally be used to: bind the system to the merchant account, be exchanged for an access token (e.g., merchant identifier), or otherwise used. In some variations, the system using the pairing code (e.g., a POS system) uses an endpoint to receive the pairing code and provide the pairing code to the platform. The endpoint can be a native application, a browser, a browser application, and the like. The endpoint can receive the pairing code via a user interface, an API, and the like. In some examples, the POS system provides the pairing code to the platform in a merchant ID request sent by the POS system to the platform (e.g., via an API of the platform). In some implementations, the merchant ID request is provided by using an HTTP-based API (e.g., a REST API). However, any suitable type of API can be used. S212 can include the platform 110 receiving the pairing code from a POS system (e.g., 131). In some variations, the pairing code is received in the merchant ID request. In some variations, the merchant ID request includes a POS device identifier. In some variations, the merchant ID request includes a location identifier. However, the merchant ID request can include any suitable information.

In some variations, S213 (processing the pairing code) includes the platform 110 accessing information stored by the platform 110 for the pairing code. In some variations, processing the pairing code includes storing a POS system identifier (e.g., included in the merchant ID request) (for the POS system that provides the pairing code to the platform) in association with merchant account information for the merchant account associated with the pairing code. In this manner, the POS system can be linked to the merchant account via its POS system identifier. Alternatively, only valid merchant identifiers are stored by the platform. In some implementations, the platform 110 accesses merchant account information associated with the pairing code. In some implementations, the merchant account information includes a merchant identifier.

In some variations, S214 includes the platform providing the merchant identifier to the POS system that provided the pairing code. However, the merchant identifier can be provided to another system (e.g., a system identified in the merchant ID request). The merchant identifier can be a session key, API token, random number, or any other suitable type of identifier. Alternatively, the pairing code can function as the merchant identifier. The merchant identifier is preferably stored in association with the merchant account information and optionally the auxiliary device information (e.g., POS identifier, payor identifier, POS account identifier, etc.) for the auxiliary device receiving the merchant identifier, but can be otherwise stored. The merchant identifier can be: time limited (e.g., expire after a predetermined period of time), geo-limited, access-point limited, nontransferable, transferrable, unlimited, or have any other suitable properties.

The platform can generate: a merchant identifier for each pairing code (e.g., before providing the pairing code, after providing the pairing code but before receiving the pairing code from a POS system, after receiving the pairing code form the POS system); a merchant identifier for each pairing code instance (e.g., wherein the merchant identifier is valid for a single auxiliary device); a single merchant identifier for multiple pairing codes, and/or any other suitable number of merchant identifiers. In some implementations, the platform 110 generates a unique merchant identifier for each pairing code for the merchant account. For example, if a pairing code is shared among several POS systems, then each POS system will receive the same merchant identifier for the merchant account. In some implementations, the platform generates a unique merchant identifier for each POS system. For example, if a pairing code is shared among several POS systems, then each POS system will receive a unique merchant identifier for the merchant account. In some implementations, the platform generates a unique merchant identifier for each location (e.g., geographic location, location within a building, storefront, etc.). For example, if a pairing code is shared among several POS systems, then each POS system at the same location will receive the same merchant identifier for the merchant account, whereas POS systems at different locations will receive different merchant identifiers for the merchant account. In this manner, generation of merchant identifiers for POS systems can be used to track usage of the merchant account (e.g., API requests, transactions, etc.) for individual POS systems for a merchant (or group of merchants), individual locations for a merchant (or group of merchants), and individual merchants. However, merchant identifiers can otherwise be generated.

In some variations, providing a merchant identifier to a POS system includes generating authorization permissions for the POS system. In some variations, the authorization permissions are associated with the merchant identifier, such that any POS system that is authorized to use the same merchant identifier has the same authorization permissions. In some variations, the authorization permissions are associated with a combination of a merchant identifier and one or more of a POS system identifier and an IP address, such that different POS systems using the same merchant identifier can have different authorization permissions. In some implementations, merchant identifiers are associated with IP addresses, such that the platform only processes requests that include a valid merchant identifier that is received from a valid IP address for the merchant identifier. In some implementations, merchant identifiers are associated with POS system identifiers, such that the platform only processes requests that include a valid merchant identifier that is received from a valid POS system. However, authorization permissions can be otherwise determined and/or assigned.

The permissions can identify actions, transactions, requests, API calls, etc. that can be performed by the POS system on behalf of the merchant account.

In some variations, a POS system can use a merchant identifier (e.g., received at S214) to access the platform's API, to initiate charges (e.g., request asset addresses), perform a withdrawal, or to perform any other suitable type of action for the merchant account that is authorized for the merchant identifier (e.g., as identified by the authorization permission for the POS system).

In variants, the method includes configuring one or more merchant accounts to be used by a payor system (e.g., POS system) configured at S210. Configuring a merchant account for a merchant can include receiving an address generation public key (e.g., extended public key) for a digital wallet of the merchant (e.g., from any suitable computing system managed by the merchant).

Figure 3B:
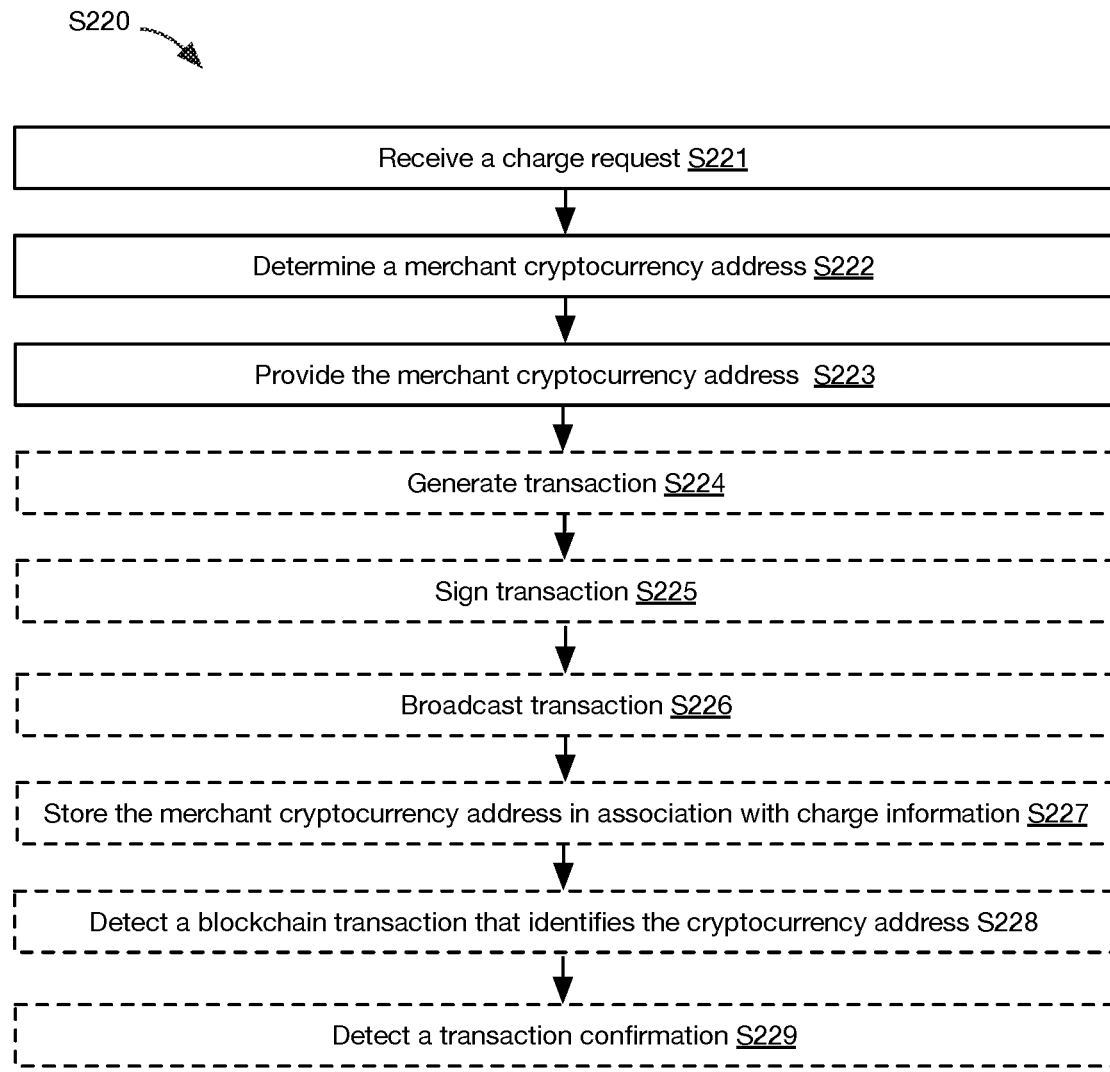

S220 functions to process a point of sale charge. S220 can include one or more of: receiving a charge request from a payor system (e.g., POS system) (e.g., 131-133) S221; determining a merchant cryptocurrency address for the charge request S222; providing the merchant cryptocurrency address to the payor system S223; generating a transaction that identifies the merchant cryptocurrency address S224; signing the transaction S225; broadcasting the transaction S226; storing the merchant cryptocurrency address in association with information (e.g., merchant account information, charge information, charge metadata, transaction data, etc.) related to the charge request S227; detecting a blockchain transaction that identifies the merchant cryptocurrency address S228; and detecting at least one transaction confirmation for the detected blockchain transaction S229 (e.g., as shown in FIGS. 3B and 5).

S221 can include the platform 110 receiving a charge request from a payor system (e.g., POS system) (e.g., 131-133). The charge request can be generated by the payor system in response to receipt of a purchase request from a customer (e.g., a user), in response to selection of a "charge" or "pay" icon by an employee (e.g., a user), be automatically generated (e.g., in response to product identification at a checkout system); and/or generated at any other suitable time.

The charge request can include one or more of: a merchant identifier (e.g., provided by the platform at S214), an address request, charge information, and/or other data. Charge information can include at least one of: a name; a description (e.g., a description of goods, description of services, description of donation, etc.); a pricing type (e.g., no price, fixed price); a local price (e.g., a price in local fiat currency); metadata (e.g., metadata generated by the payor system); a redirect URL; a cancel URL; a transaction identifier; a selected cryptocurrency; and/or other information about the charge. However, the charge information can include any suitable type of information. Metadata can include customer information (e.g., e-mail address, telephone, mailing address, rewards number, driver's license number, age verification information, tracking information, referral codes, etc.).

In a first example, the charge request includes an address request and the merchant identifier. In a second example, the charge request can include the charge information and the merchant identifier. In this example, the platform can return a set of unsigned transactions (e.g. for all supported assets, for a customer-specified asset, etc.), the set of addresses, a URL redirecting the user to the platform domain, or return other information. However, any other suitable set of information can be provided in response to the charge request.

S222 can include determining at least one merchant cryptocurrency address (blockchain address, payment address) used to process the charge request, based on a merchant identifier included in the charge request. An address can be generated for each cryptocurrency supported by the merchant associated with the charge request (e.g., S222 can include generating addresses for Bitcoin, Bitcoin Cash, Etherium, Litecoin, USC Coin, ERC20 token, or any other supported cryptocurrency), using the address generation protocol for the respective cryptocurrency. The addresses for different cryptocurrencies can be generated from the same or different address generation public key. Alternatively, an address can be generated for a cryptocurrency identified by the charge information. The address determined at S222 can be a new address, or a previously used address. The address determined at S222 can be pre-generated, generated in response to the charge request, or otherwise generated at any suitable time and in response to any suitable trigger or event.

In some implementations, determining a new merchant cryptocurrency address includes generating an address. Generating an address can include accessing a public key (e.g., an extended public key, xPubKey, an address generation public key of a digital wallet of the merchant) for the merchant account associated with the merchant identifier, and generating a cryptocurrency address by using the public key. In some implementations, determining a new merchant cryptocurrency address includes accessing a stored address that was previously generated for the merchant account.

In variants, generating an address at S222 includes generating an address included in a digital wallet (e.g., a hierarchical deterministic wallet) managed by the merchant. In an example, the digital wallet includes an address generation public key (e.g., extended public key) that can be used to generate new addresses for the digital wallet, such that transactions transferring funds from these new addresses can be signed by using a private key included in the digital wallet. In an example, a single private key of the digital wallet can be used to sign transactions transferring funds from any address included in the digital wallet. The merchant can provide the address generation public key of the digital wallet to the platform 110, the platform 110 can use the address generation public key to generate new addresses of the digital wallet, and a merchant system can use the private key of the digital wallet to sign a transaction transferring funds from any of the addresses generated by the platform by using the address generation public key. In some implementations, the address generation public key is an extended public key of a hierarchical deterministic digital wallet.

In a first variation, S222 includes determining a new merchant cryptocurrency address for each charge request. In a second variation, S222 includes determining a same merchant cryptocurrency address for two or more charge requests. However, the merchant cryptocurrency address can be otherwise determined.

The merchant cryptocurrency addresses can be stored by the platform in association with the merchant account, a charge identifier, the charge information, a predetermined state (e.g., "unused"), and/or other information.

S223 can include the platform 110 providing one or more addresses generated at S222 for the charge request (received at S221). Each address can be provided to the system that initiated the charge request (e.g., a POS system). However, one or more generated addresses can be provided to a system identified in the charge request, or otherwise provided to one or more systems. The merchant cryptocurrency addresses received by the requesting system (e.g., payor system) can optionally be stored by the receiving system, such as for future inquiries (e.g., to determine the charge state from the platform, from the blockchain, etc.).

In variants, any system (e.g., a POS system, a merchant system, a customer system, etc.), receiving an address determined at S222 can use an address provided by the platform 110 at S222 for processing a cryptocurrency transaction. Processing a cryptocurrency transaction can include one or more of: generating the transaction S224; signing the transaction S225; and broadcasting the transaction S225.

Generating the transaction (S224) can include: selecting a cryptocurrency address from a set of addresses received from the platform 110 (e.g., at S223). In some variations, any suitable system (e.g., a POS system, a merchant system, a customer system, etc.) can select a cryptocurrency address from a set of addresses received form the platform 110. In a first variation, the address set includes a plurality of addresses (e.g., one for each of a plurality of assets). In a second variation, the address set includes a single address. The selected address is preferably the address for the asset that the user is paying with (e.g., the address for the blockchain network supporting the user's payment asset), but can be another address. The asset address can be selected: by the user, by the POS system, or otherwise selected.

The generated transaction is preferably an unsigned transaction (e.g., unsigned blockchain transaction), but can alternatively be another transaction. The transaction is preferably generated by the user device (e.g., the signing device, wherein the transaction information, such as amount and address, can be transmitted to the user device), by the requesting system (e.g., POS system, where the requesting system receives the user's cryptocurrency address), by the platform (e.g., returned in response to the charge request, generated in response to requesting system navigation to a redirection URL associated with the set of addresses or charge request, etc.), or by another device. The generated transaction preferably includes the selected address as the recipient of the funds and a user address (e.g., customer address) as the sender, but can be otherwise constructed.

In some variations, a single system (e.g., POS system) generates the transaction (S224) and signs the transaction (S225), whereas in other variations, at least a first system generates the transaction and at least a second system signs the transaction.

The transaction can be signed (at S225) with a key managed by any one or more of a POS system, a merchant system, and a customer system. However, any suitable system or entity can manage one or more keys used to sign the transaction. In variations, the signing key is not managed by any system, but rather generated by a system in response to receiving a password or secret passphrase via a user input device, optical input device, or network interface. In a first variation, signing the transaction Ss225 includes signing the generated transaction with a cryptocurrency private key paired with the user's cryptocurrency address in a secure signing enclave on the user device. In a second variation, signing the transaction (S225) can include performing a multi-signature operation in which the transaction is signed by using multiple signing keys (e.g., a different system or entity can manage each or a set of the multiple signing keys).

In variants, any system (e.g., a POS system, a merchant system, a customer system, etc.) can broadcast the signed transaction (at S226) to a blockchain network (e.g., 150) that supports the cryptocurrency associated with the transaction. For example, in variations, any one of a system that generates the transaction, a system that signs the transaction, and a system that does not generate or sign the transaction can broadcast the transaction.

In a first variation, the customer system (e.g., 141, 142) receives at least one merchant cryptocurrency address (received by the POS system at S223) (e.g., via a user input device, camera, or network interface device of the customer system, etc.), and the customer system generates (S224) and signs (S225) the payment transaction. In some implementations, the POS system can receive user selection (e.g., via a user input device of the POS system, via a user input device of the customer system, etc.) of a particular cryptocurrency supported by the POS system, and then provide the address for the selected cryptocurrency to the customer system (or a user of the customer system who enters the address into the customer system via a user interface device). Providing the address to a user can include displaying the address at a display of the POS system. Providing the address to the customer system can include transmitting the address to the customer system via a network interface, presenting a visual code (e.g., a QR code, a barcode, etc.) that the customer system scans, sending the address over a short-range communication channel (e.g., Bluetooth connection, BLE connection, NFC connection, etc.), sending the address encoded in an electromagnetic or acoustic signal, or otherwise communicating the address to the customer system. The customer system then generates a payment transaction (S224) that sends funds to the received cryptocurrency address from a source address associated with the customer system, and signs (S225) the generated payment transaction by using the customer's private key In a second variation, the POS system receives a source cryptocurrency address of a customer system (e.g., 141, 142) (e.g., via a user input device, camera, or network interface device of the POS system, etc.), generates a payment transaction (S224) that sends funds to the received cryptocurrency address (received at S223) from the received source address. The POS system can provide the generated unsigned transaction to the customer system (e.g., 141, 142) or to a user of the customer system. Providing the unsigned transaction to a user can include transmitting the address to the customer system via a network interface; presenting a visual code (e.g., a QR code, a barcode, etc.) that the customer system scans; sending the unsigned transaction over a short-range communication channel (e.g., Bluetooth connection, BLE connection, NFC connection, etc.); sending the unsigned transaction encoded in an electromagnetic or acoustic signal; or otherwise communicating the unsigned transaction to the customer system. The customer system signs the received unsigned transaction by using the customer's private key (S225).

In some variations, the customer system sends the signed payment transaction (e.g., generated by the POS system and signed by the customer system, generated and signed by the POS system, etc.) to a receiving system (e.g., one or more of the platform 110, and the POS system) via one or more of a network interface and a camera of the receiving system. When the signed transaction is sent to an intermediary receiving system, the receiving system can optionally store information about the transaction. For example, the receiving system can: mark the address as used, store the transaction information (e.g., transaction hash), compare the transaction amount to the charge amount, or otherwise process the signed transaction. The system receiving the signed payment transaction can broadcast the signed payment transaction to the associated blockchain network (e.g., 150) directly or indirectly via another system (S226). In some variations, the customer system broadcasts (S226) the signed payment transaction to the associated blockchain network (e.g., 150) (e.g., the blockchain network supporting the payment asset; the blockchain network whose protocol was used to generate the transaction, etc.).

S227 can include the platform 110 storing at least one address determined at S222 in association with charge information (e.g., received at S221). In variants, the platform 110 creates data structures that identify a merchant payment address (payment destination) and charge information that describes a charge to be received at the payment address. In some variations, the platform 110 stores at least one address determined at S222 with merchant account information associated with the charge request received at S221.

S228 can include detecting the signed payment transaction on the blockchain network. In some variations, S228 includes reading data recorded on the blockchain network 150 and monitoring for a transaction that includes a cryptocurrency address determined at S222. S228 can be performed by a payor system (e.g., POS system), the platform 110, or any other suitable system. In some variations, in response to detecting the payment transaction on the blockchain network 150, the platform 110 updates a merchant ledger for the merchant account associated with the payment transaction (e.g., by marking the related charge as pending). In some implementations, the platform 110 notifies one or more of the POS system and the customer system that the transaction has been detected and/or of the updated charge state. In other implementations, the POS system and/or customer system monitors the blockchain network to detect the signed payment transaction.

In some variations, in response to detecting the payment transaction on the blockchain network 150, the POS system displays a charge notification on a display device of the POS system. In some variations, in response to detecting the payment transaction on the blockchain network 150, the POS system sends a charge notification to the customer system. In some variations, the charge notification is a charge pending notification. In other variations, the charge notification is a charge complete notification (indicating that the charge has been completed, regardless of a number of confirmations detected for the transaction on the blockchain network).

S229 can include detecting one or more transaction confirmations for the detected signed payment transaction on the blockchain network. S229 can be performed on any one of the platform 110, a POS system, and a customer system. In some variations, the system detecting confirmations sends at least one confirmation notification to at least one of a POS system, a customer system, and the platform 110.

In some variations, in response to detecting a predetermined number of transaction confirmations for the transaction, the platform 110 updates a merchant ledger for the merchant account associated with the payment transaction (e.g., by marking the related charge as completed). In some implementations, the platform 110 notifies one or more of the POS system and the customer system that the predetermined number of confirmations has been detected. In other implementations, the POS system monitors the blockchain network to detect the predetermined number of transaction confirmations for the transaction.

In some variations, S229 is optional. In some variations, the predetermined number of transaction confirmations can be any suitable number that can be configured or automatically determined.

In an example, information stored at the platform in association with a merchant identifier used for the charge is used to determine the predetermined number of transaction confirmations. In an example, information stored at the platform in association with a merchant account used for the charge is used to determine the predetermined number of transaction confirmations. The predetermined number can be pre-configured and explicitly defined in configuration. Alternatively, one or more rules can be configured for dynamically determining the predetermined number of confirmations required.

In variants, unlike on-line charges, for an in-person charge involving a customer located at a merchant's physical location, and paying using a POS terminal, it is desirable to control the number of confirmations needed to complete a charge. By controlling the number of required confirmations, a merchantman provides a pleasant user experience to the customer while maintaining a desired level of transaction security. For example, a customer purchasing a cup of coffee for $1 worth of BTC should not have to stand waiting near a POS terminal for an extended period of time before the charge completes and the customer can walk away knowing that they have paid for their coffee. If the charge amount is low, and the customer is physically present, it may not be necessary to require the same amount of confirmations to validate a cryptocurrency payment, as compared to a larger transaction that is performed on-line. In variants, the method enables determination of the number of confirmations required to complete a charge that provides a practical user experience for paying with cryptocurrency at a POS terminal in a merchant store.

The number of charge transactions can be determined (e.g., by the platform 110, or any other suitable computing system) based on one or more of a charge amount, a location of the POS system, an identifier of the POS system, an identifier of the customer system, an identifier of the customer, a description of the goods or services sold, charge information, metadata, fraud risk information, the blockchain network, the current confirmation time for the blockchain network, or any other suitable type of information. The number of charge transactions can be: predetermined, determined from merchant preferences, selected from a lookup table, calculated, or otherwise determined. For example, for a POS system at a store that has historically been victim of fraudulent in-person cryptocurrency purchases, the number of required confirmations can be greater, as compared to stores that have not experienced such fraud. The required number of confirmations can be higher for charges involving higher amounts, as opposed to charges with smaller amounts. The required number of confirmations can be higher for goods more likely to be associated with fraud. The required number of confirmations can be higher for customers that have been known to be associated with fraud. The required number of confirmations can be low for long-confirmation-time blockchains, such as bitcoin (e.g., no confirmations, 1 confirmation, etc.) and high for fast-confirmation-time blockchains, such as Ethereum. However, the determination of the number of required confirmations (or whether transaction detection is sufficient, such that no confirmations are required at all) can be performed in any suitable manner to balance requirements for user experience with security requirements.

In some variations, in response to detecting the predetermined number of transaction confirmations for the transaction, the POS system displays a charge complete notification on a display device of the POS system. In some variations, in response to detecting the payment transaction on the blockchain network 150, the POS system sends a charge complete notification to the customer system.

S230 functions to manage POS charge information S230. S230 can include receiving a request for information for a merchant cryptocurrency address (e.g., from a POS system, a merchant system, etc.), and providing the requested information (e.g., to a POS system, a merchant system, etc.). Requests for information can include requests for charges made using a specified merchant cryptocurrency address, requests for charges made at an identified POS system, requests for charge information (or a portion of the charge information) stored by the platform 110 for a selected charge.

In some variations, the POS system stores addresses received from the platform 110 in connection with charge requests initiated by the POS system. The POS system can then send a charge information request to the platform 110 to request one or more of charge status (e.g., pending, completed, no charge, etc.) and charge information stored at the platform 110 for an address stored by the POS system. In some variations, the POS system uses its merchant identifier (received at S214) to authenticate the POS system with the platform, and the platform 110 uses the merchant identifier to determine whether the POS system is authorized to receive the requested information. In some variations, the platform 110 stores permissions that restrict a POS system from receiving information for charges made by one or more other POS systems. For example, POS systems in a first store can be prevented from accessing charge information for charges made by POS systems in other stores. Access permissions for charge information can be associated with merchant identifiers, and configured in any suitable manner.

In one variation, the platform only returns information for requested addresses (or charge identifiers or transaction identifiers). Since the POS system only has access to the received addresses, the POS system can only access the charges that it has processed, and cannot access other charges. In a second variation, the platform can identify the merchant account associated with the POS-provided address, and return information for all transactions associated with the merchant account. However, any other suitable information can be returned in response to an information request from the POS system.

The method can optionally include receiving a merchant information request from a merchant account. The merchant information request can be associated with merchant credentials, merchant authentication (e.g., 2-factor authentication), and/or other authenticating information. The platform preferably provides all charge-related information in response to the merchant information request (e.g., for transactions to all generated merchant addresses, for transactions facilitated by multiple POS systems, etc.), but can alternatively provide information for a subset of the charges, provide a subset of the charge-related information, or otherwise limit information access.

S240 can include one or more of revoking a merchant identifier, changing access permissions for a merchant identifier, enabling withdrawal permissions for a merchant identifier (e.g., for one or more merchant cryptocurrency addresses), and the like. POS systems can be managed automatically, in response to user input received from a user (e.g., a merchant), or otherwise managed. In some implementations, a merchant identifier can be automatically revoked based on one or more triggers (e.g., fraud detection, store closing, change of ownership of POS system, removal of POS system from production use, etc.), manually revoked, or otherwise revoked.

In some variations, the method 200 includes processing a withdrawal S250. In variants, processing a withdrawal S250 functions to withdraw funds from one or more cryptocurrency addresses (e.g., determined for the merchant account at S222), e.g., as disclosed in U.S. App. 62/814,194 filed 5 Mar. 2019 and/or U.S. application Ser. No. 16/810,677 titled SYSTEMS AND METHODS FOR WITHDRAWAL CONSOLIDATION, filed 5 Mar. 2020, each of which incorporated in its entirety by this reference).

In some variations, processing a withdrawal S250 includes: receiving a withdrawal request and processing the withdrawal request. The withdrawal request can be received from any suitable computing system. In an example, the withdrawal request is received from a payee system (e.g., 121) (e.g., a merchant system) associated with a merchant account for which funds are to be withdrawn. In variants, the withdrawal request identifies a withdrawal amount and a withdrawal destination.

In a first variation, the withdrawal request is processed by transferring funds directly to the withdrawal destination. In a second variation, the withdrawal request is processed by transferring funds to one or more consolidation addresses before transferring the funds to the withdrawal destination. In this manner, security can be improved.

In the first variation of processing a withdrawal request (direct withdrawal), processing the withdrawal request includes: selecting at least one payment cryptocurrency address of the merchant account to satisfy the withdrawal request S251; generating an unsigned withdrawal transaction that identifies each selected payment cryptocurrency address and the withdrawal destination S254; sending the unsigned withdrawal transaction to the merchant system S255; receiving a signed withdrawal transaction from the merchant system S256; and sending the signed withdrawal transaction to a blockchain network S257 (as shown in FIG. 7), wherein signed withdrawal confirmation on the blockchain network transfers the assets from the selected payment cryptocurrency address(es) to the withdrawal destination.

In the second variation of processing a withdrawal request (withdrawal consolidation), processing the withdrawal request includes: selecting at least one payment cryptocurrency address of the merchant account to satisfy the withdrawal request S251; determining a consolidation address that is under direct ownership of the payee S252; generating at least one unsigned consolidation transaction that identifies at least one selected payment cryptocurrency address as an input and the generated consolidation address as an output S253; generating an unsigned destination transaction that identifies the generated consolidation address as an input and the withdrawal destination as an output S254; sending the unsigned destination transaction and each unsigned consolidation transaction to the merchant system S255; receiving from the merchant system: a signed destination transaction for the unsigned destination transaction sent to the merchant system, and a signed consolidation transaction for each unsigned consolidation transaction sent to the merchant system S256; and sending the signed destination transaction and each signed consolidation transaction to a blockchain network S257 (as shown in FIG. 7). In variants, the consolidation address is generated by using the address generation public key (e.g., an extended public key) of the digital wallet of the payor. In some implementations, the address generation key used to generate consolidation addresses at S252 is the same address generation key used to generate a payment cryptocurrency address at S222.

One or more of the platform 110 and the payee system (e.g., 121) (e.g., the merchant system) perform at least a portion of S250.

However, withdrawal can otherwise be performed.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A cryptocurrency platform for comprising at least one processor, memory and a database storing a plurality of merchant identifiers, wherein the memory stores executable instructions that, when executed by the at least one processor, causes the at least one processor to perform the steps of:

receiving a charge request from a point-of-sale (POS) system of a merchant, wherein the charge request is a request to pay the merchant;

in response to receiving the charge request from the POS system to pay the merchant, retrieving a merchant identifier for the POS system from the database, and generating a blockchain address associated with the merchant identifier for the POS system using an address generation public key of a digital wallet of the merchant;

sending, to the POS system, the generated blockchain address associated with the merchant identifier for the POS system;

determining a charge notification threshold for sending a charge notification related to a payment blockchain transaction for the merchant to the blockchain address, wherein determining the charge notification threshold comprises:

in response to determining that the merchant identifier is a first merchant identifier for a first POS system of the merchant, determining, as the charge notification threshold, a first number of blockchain transaction confirmations of the payment blockchain transaction for the merchant to the blockchain address; and in response to determining that the merchant identifier is a second merchant identifier for a second POS system of the merchant, determining, as the charge notification threshold, a second number of blockchain transaction confirmations of the payment blockchain transaction for the merchant to the blockchain address, the second number of blockchain transaction confirmations being different from the first number of blockchain transaction confirmations;

monitoring, over a communications network, a blockchain;

detecting a number of confirmations of the payment blockchain transaction on the monitored blockchain that meets or exceeds the charge notification threshold; and in response to the detection of the number of confirmations on the blockchain, sending, to the POS system, the charge notification comprising an indication that a charge associated with the charge request has been confirmed.

2. The cryptocurrency platform of claim 1, the steps further comprising:

receiving the address generation public key of the digital wallet of the merchant during configuration of a merchant account for the merchant, wherein the cryptocurrency platform does not include any private keys of the digital wallet of the merchant.

3. The cryptocurrency platform of claim 1, wherein the charge request received from the POS system comprises the merchant identifier for the POS system.

4. The cryptocurrency platform of claim 1, wherein the second number of blockchain transaction confirmations is greater than the first number of blockchain transaction confirmations.

5. The cryptocurrency platform of claim 1, wherein determining the first number of blockchain transaction confirmations comprises determining, as the charge notification threshold, the first number of blockchain transaction confirmations based on a first location of the first POS system.

6. The cryptocurrency platform of claim 1, wherein determining the first number of blockchain transaction confirmations comprises determining, as the charge notification threshold, the first number of blockchain transaction confirmations based on first historical activity information related to the first POS system.

7. The cryptocurrency platform of claim 1, wherein determining the first number of blockchain transaction confirmations comprises determining, as the charge notification threshold, the first number of blockchain transaction confirmations based on first fraud risk information related to the first POS system.

8. The cryptocurrency platform of claim 1, wherein determining the first number of blockchain transaction confirmations comprises determining, as the charge notification threshold, the first number of blockchain transaction confirmations based on (i) first POS activity information associated with the first POS system and (ii) first customer activity information associated with a customer interacting with the POS system.

9. The cryptocurrency platform of claim 1, wherein determining the first number of blockchain transaction confirmations comprises determining, as the charge notification threshold, the first number of blockchain transaction confirmations based on (i) first POS activity information associated with the first POS system and (ii) a payment amount associated with the payment blockchain transaction.

10. A method being implemented by one or more processors executing computer program instructions that, when executed by the one or more processors, cause operations comprising:

receiving a charge request from a point-of-sale (POS) system of a merchant, wherein the charge request is a request to pay the merchant;

in response to receiving the charge request from the POS system to pay the merchant, retrieving a merchant identifier for the POS system from a database, and generating a blockchain address associated with the merchant identifier for the POS system using an address generation public key of a digital wallet of the merchant;

sending, to the POS system, the generated blockchain address associated with the merchant identifier for the POS system;

determining a charge notification threshold for sending a charge notification related to a payment blockchain transaction for the merchant to the blockchain address, wherein determining the charge notification threshold comprises:

in response to determining that the merchant identifier is a first merchant identifier for a first POS system of the merchant, determining, as the charge notification threshold, a first number of blockchain transaction confirmations of the payment blockchain transaction for the merchant to the blockchain address; and in response to determining that the merchant identifier is a second merchant identifier for a second POS system of the merchant, determining, as the charge notification threshold, a second number of blockchain transaction confirmations of the payment blockchain transaction for the merchant to the blockchain address, the second number of blockchain transaction confirmations being different from the first number of blockchain transaction confirmations;

monitoring, over a communications network, a blockchain;

detecting a number of confirmations of the payment blockchain transaction on the monitored blockchain that meets or exceeds the charge notification threshold; and in response to the detection of the number of confirmations on the blockchain, sending, to the POS system, the charge notification comprising an indication that a charge associated with the charge request has been confirmed.

11. The method of claim 10, wherein the charge request received from the POS system comprises the merchant identifier for the POS system.

12. The method of claim 10, wherein determining the first number of blockchain transaction confirmations comprises determining, as the charge notification threshold, the first number of blockchain transaction confirmations based on a first location of the first POS system.

13. The method of claim 10, wherein determining the first number of blockchain transaction confirmations comprises determining, as the charge notification threshold, the first number of blockchain transaction confirmations based on first historical activity information related to the first POS system.

14. The method of claim 10, wherein determining the first number of blockchain transaction confirmations comprises determining, as the charge notification threshold, the first number of blockchain transaction confirmations based on first fraud risk information related to the first POS system.

15. A non-transitory computer-readable media storing instructions that, when executed by one or more processors, cause operations comprising:

receiving a charge request from a point-of-sale (POS) system of a merchant, wherein the charge request is a request to pay the merchant;

in response to receiving the charge request from the POS system to pay the merchant, retrieving a merchant identifier for the POS system from a database, and generating a blockchain address associated with the merchant identifier for the POS system using an address generation public key of a digital wallet of the merchant;

sending, to the POS system, the generated blockchain address associated with the merchant identifier for the POS system;

determining a charge notification threshold for sending a charge notification related to a payment blockchain transaction for the merchant to the blockchain address, wherein determining the charge notification threshold comprises:

in response to determining that the merchant identifier is a first merchant identifier for a first POS system of the merchant, determining, as the charge notification threshold, a first number of blockchain transaction confirmations of the payment blockchain transaction for the merchant to the blockchain address; and in response to determining that the merchant identifier is a second merchant identifier for a second POS system of the merchant, determining, as the charge notification threshold, a second number of blockchain transaction confirmations of the payment blockchain transaction for the merchant to the blockchain address, the second number of blockchain transaction confirmations being different from the first number of blockchain transaction confirmations;

monitoring, over a communications network, a blockchain;

detecting a number of confirmations of the payment blockchain transaction on the monitored blockchain that meets or exceeds the charge notification threshold; and in response to the detection of the number of confirmations on the blockchain, sending, to the POS system, the charge notification comprising an indication that a charge associated with the charge request has been confirmed.

16. The media of claim 15, wherein determining the first number of blockchain transaction confirmations comprises determining, as the charge notification threshold, the first number of blockchain transaction confirmations based on a first location of the first POS system.

17. The media of claim 15, wherein determining the first number of blockchain transaction confirmations comprises determining, as the charge notification threshold, the first number of blockchain transaction confirmations based on first historical activity information related to the first POS system.

18. The media of claim 15, wherein determining the first number of blockchain transaction confirmations comprises determining, as the charge notification threshold, the first number of blockchain transaction confirmations based on first fraud risk information related to the first POS system.

19. The media of claim 15, wherein determining the first number of blockchain transaction confirmations comprises determining, as the charge notification threshold, the first number of blockchain transaction confirmations based on (i) first POS activity information associated with the first POS system and (ii) first customer activity information associated with a customer interacting with the POS system.

20. The media of claim 15, wherein determining the first number of blockchain transaction confirmations comprises determining, as the charge notification threshold, the first number of blockchain transaction confirmations based on (i) first POS activity information associated with the first POS system and (ii) a payment amount associated with the payment blockchain transaction.

\* \* \* \* \*